United States Patent Office 2,894,801
Patented July 14, 1959

2,894,801

TEXTILE PRINTING EMULSIONS

Julien Paul, Fall River, Mass., assignor to United Merchants and Manufacturers, Inc., New York, N.Y., a corporation of Delaware No Drawing. Application November 29, 1956
Serial No. 624,973

13 Claims. (Cl. 8—70)

This invention relates to textile printing emulsions useful as such for the production of colored effects on white or dyed fabrics or for the production of white or colored effects on fabrics which have been dyed with dischargeable dyes.

In the specification and claims all percentages are on a weight basis.

Vat dye printing pastes containing starches or gums, such as tragacanth or British gum are used conventionally. Such utilization of starch or gum-containing vehicles for the vat dyes have a number of objections including, among others, (a) they adhere to the fabric and are difficult to remove; (b) they deleteriously affect the color; and (c) they deleteriously alter the hand of the fabric. It has been proposed to substitute for such vehicles, emulsions of the water-in-oil and oil-in-water type having the alkali and reducing agent for the vat dye dissolved in the water. Such emulsions heretofore proposed have been objectionable for a number of reasons, among which may be mentioned (1) the reducing agent present therein tends to oxidize on standing so that it loses its effectiveness, and (2) the emulsions are comparatively unstable, particularly when relatively large amounts of electrolytes are present, such for example, as the reducing agent and the alkali invariably employed in vat dye printing pastes.

It is among the objects of the present invention to provide textile printing emulsions containing a water-soluble formaldehyde sulphoxylate reducing agent, free of the conventional starch and gum thickeners, of improved stability and in which the tendency of the reducing agent to oxidize is greatly minimized, if not substantially completely prevented.

Another object of this invention is to provide such emulsion of the oil in water type which when used as a vehicle or carrier for vat dyes results in a marked increase in color yield, particularly as compared with fabrics printed with pastes containing conventional starch and gum thickeners.

Still another object of this invention is to provide such textile printing emulsion which does not result in the production on the cloth of residual or undesired reaction products which are difficult to remove therefrom.

Still another object of the present invention is to provide such emulsion which is stable in the presence of atmospheric oxygen, i.e., a paste, which when applied to and dried on the fabric, does not have to be aged immediately after printing.

Still another object is to provide such emulsion which, when used as a vehicle or carrier for vat dyes and the resultant printing paste is printed on cloth, results in the desired uniform application of the color without streaks or "snaps" caused by a blob of paste pushing up the doctor blade so that an abnormal amount of the printing paste is permitted to flow over the surface of the fabric, which is a difficulty frequently encountered when using printing pastes containing starch or gum thickeners.

Still another object of the present invention is to provide textile printing emulsions which in use result in sharper definition and smoother prints in the relatively large blotch areas.

Still another object of this invention is to provide a printing paste particularly suited for printing on pile fabrics, such as corduroys and velvets, which printing paste does not result in damage to the appearance of the fabrics as is frequently the case when using printing pastes containing starches or gums. The latter cement the pile fibers and, hence, a second operation, such as steaming and brushing, is required to re-raise the pile with consequent damage to the pile often caused by such second treatment.

Still another object of the invention is to provide a printing paste which can be used in surface printing machines. In the case of heretofore known printing pastes, particularly those containing starches and gums, the sieve cloths used as furnishers for the paste unavoidably act as filters and become clogged by the starch and gum solids. The present invention overcomes these difficulties.

Still another object of the present invention is to provide a printing paste which can be used to print delicate fabrics, such as Bemberg rayon. The use of heretofore known printing pastes containing starches and gums often causes the fibers of such delicate fabrics to break due to brittleness imparted thereto by starches or gums.

Still another object of the invention is to provide such printing emulsions which do not leave difficultly removable residues in the printing apparatus and thereby makes it easier for the printer to clean up the equipment after the printing operation.

Other objects and advantages of this invention will be apparent from the following description thereof.

I have made the unexpected and surprising discovery that by incorporating from about 0.5% to 15%, preferably 0.75% to 2%, of a water-soluble casein compound in the aqueous solutions containing a water-soluble formaldehyde sulphoxylate reducing agent and emulsifying this solution in a hydrocarbon oil to produce an oil in water emulsion, a stable emulsion results in which the dissolved casein compound minimizes, if not completely prevents, oxidation of the formaldehyde sulphoxylate reducing agent, the emulsion remains stable, even though relatively large amounts of electrolytes are present dissolved in the water phase and the soluble casein compound does not form water-insoluble resins with the formaldehyde containing reducing agent. This is indeed surprising and unexpected when due consideration is given to the known reactivity of casein with formaldehyde to produce water-insoluble casein formaldehyde resins. Such known reactivity of casein with formaldehyde probably explains why chemists working with vat dye printing pastes containing reducing agents such as formaldehyde sulphoxylate have avoided the use of casein in such pastes, because the production of water-insoluble resinous materials would cause the printing paste to jell and would otherwise deleteriously affect the color printing operation due, for example, to the formation of water-insoluble resinous products which could not be readily washed out or off of the fabric.

Surprisingly, the incorporation of water-soluble casein compounds in the water phase of the oil in water emulsions does not, for some unexplainable reason, result in the formation of water-insoluble casein formaldehyde reaction products. On the contrary, the water-soluble casein compounds function as anti-oxidants or stabilizers, i.e., they minimize, if not completely prevent, oxidation of the formaldehyde sulphoxylate reducing agent in the emulsion on storage and even after application to the goods and as long as the printed goods are not subjected to steaming or ageing at elevated temperatures to cause the reducing agent to react with the color in the fabric to produce white effects or with the vat dye to convert it into the water-soluble alkali-leuco form which is absorbed by the fibers.

The explanation for this unexpected phenomena of the soluble casein compound not reacting with the formaldehyde to form insoluble resins, but instead functioning as an anti-oxidant for the reducing agent is not fully understood. It is believed due to a preferential chemical reaction between the water-soluble casein compound and the water-soluble formaldehyde sulphoxylate forming a complex which is stable to the effects of atmospheric oxygen (and the formation of which complex prevents any substantial reaction between casein and formaldehyde to form insoluble resins), but which complex does not alter the effectiveness of the formaldehyde sulphoxylate reducing agent during the steaming or ageing of the printed goods.

When the oil-in-water emulsion of this invention is used as a vehicle for vat dyes, it may contain the alkali required for reaction between the water-insoluble vat dye to convert the dye into the soluble alkali-leuco form. Alternatively, the alkali may be applied separately to the fabric in a printing or padding operation after the application of the printing paste containing the reducing agent and the vat dye to cause the reaction to take place between the alkali, the reducing agent and the vat dye to convert the dye into a soluble alkali-leuco form which is readily absorbed by the fibers in the subsequent steaming or ageing treatment.

As the reducing agent, water-soluble formaldehyde sulphoxylate compounds are employed, such, for example as alkali metal formaldehyde sulphoxylate, including sodium or potassium formaldehyde sulphoxylate. Sodium formaldehyde sulphoxylate is preferred for reasons of economy and ready availability. The amount of reducing agent incorporated in the vehicle in general is from 4% to 20% based on the weight of the vehicle. Within this range the amount will vary depending on the intended use. Optimum results are obtained by using from 8% to 12% for application printing and from about 10% to 18% for discharge printing.

As the water-soluble casein compound, ammonium, borax and alkali metal, such as sodium or potassium caseinates, may be used. The amount of caseinate incorporated in the vehicle is from 0.5% to 15%, preferably from 0.75% to 2%, based on the weight of the vehicle or carrier. These amounts are critical; the improved and unexpected results are obtained only when using amounts within this range.

The alkali, if incorporated in the vehicle, is incorporated in amount of from 2% to 12%, based on the weight of the vehicle, preferably from 5% to 10% when sodium carbonate is used as the alkali. Instead of sodium carbonate, alkali metal hydroxides, such as sodium or potassium hydroxide, potassium carbonate or amines, such as triethanolamine, may be used. When using alkali other than sodium carbonate, the amount thereof should be the chemical equivalent of the indicated amount of the sodium carbonate.

The water phase of the oil-in-water emulsion may also contain other constituents commonly employed in textile printing pastes, such, for example, as hygroscopic agents, e.g., glycerin, diethylene glycol, monoethylene glycol, 2-methyl-2, 4-pentanediol, urea, or mixtures of these hygroscopic materials; dispersing agents, e.g., ethylene oxide condensates, such as hexyl heptyl beta naphthol with 9 mols of ethylene oxide per mol of hexyl heptyl beta naphthol (Peregal ON) or sodium lignin sulphonates; thickeners, e.g., sodium alginate, carboxy methyl cellulose and guargum; preservatives; germicides, fungicides or antiseptic agents, such as sodium o-phenyl-phenate (Dowicide A); and other agents, such as anthraquinone and other catalysts which are used to improve the discharge effect.

The hydrocarbon oil in which the aqueous solution is dispersed to form the oil-in-water emulsion may be any hydrocarbon solvent, aliphatic, aromatic, or a mixture containing both aliphatic and aromatic constituents, boiling within the range of from 100° C. to about 300° C. and having a KB value of from 45 to 55. The KB value is determined as conventional by determining the point at which a standardized kauri-butanol solution at 25° C. becomes cloudy upon addition of the hydrocarbon oil thereto. Suitable hydrocarbon oils are the petroleum fractions sold as mineral spirits, such as Shell mineral spirits No. 8181 or Varsol No. 2. The emulsion contains from about 25% to about 45% by weight of the hydrocarbon oil phase and from about 55% to about 75% by weight of the water solution phase.

In the production of the emulsion, after the dissolution of the reducing agent and the water-soluble caseinate in the water to which may be added the other constituents, if used, such as alkali, hygroscopic agent, thickener and dispersing agent, the hydrocarbon oil is added, using, for example, an Eppenbach homogenizer for the preparation of the initial solution, as well as the emulsion. For example, the caseinate and hygroscopic agent may first be dissolved in the water employing a homogenizer for the purpose. Thereafter the alkali, if used, is dissolved in the solution and then the reducing agent, while stirring vigorously. It is important to avoid the entrainment of air into the solution, because such air would cause oxidation of the reducing agent. Moreover, during the formation of the solution, the temperature should be maintained below about 30° C. to avoid the decomposition of the reducing agent. After formation of the solution, the hydrocarbon oil is added while continuing the agitation, thus producing an oil-in-water emulsion. It is preferable to add the hydrocarbon oil below the surface of the solution, desirably directly at the mixing head or blades of the blender or homogenizer in the batch.

The oil-in-water emulsion vehicle thus produced has a viscosity of from about 100 to 500 poises, preferably 150 to 300 poises, as determined on a Brookfield viscosimeter.

The emulsion may be applied as such by the printing roll to form whites on the fabric, or may be mixed with vat dyes to produce color printing pastes. Thus, the oil-in-water emulsion may be mixed with from 0% to 30% vat dye. The vat dye used will of course depend on the desired color. This invention can be used to apply all known vat dyes employed in textile printing, examples of some of which are given in the examples below.

After application of the printing paste containing the reducing agent, alkali and vat dye, the printed goods are dried, aged in a steam ager, desirably at a temperature of from about 101° C. to about 105° C. for about 6 to 10 minutes, acidified with acetic, hydrochloric or other acid, oxidized with hydrogen peroxide, sodium bichromate or sodium perborate and thereafter washed with a dilute soap or detergent solution and then dried to bring out the color contrast to best advantage.

Where the oil-in-water emulsion is applied as such to fabrics which have been dyed with dischargeable dyes, the treatment is substantially the same. The treatment in the steam ager results in the reducing agent reacting with the dyed fabric to produce whites wherever the reducing agent is applied.

The invention includes oil-in-water emulsions containing no alkali, particularly when employing such emulsions for the production of whites on fabrics which have been dyed with dischargeable dyes.

The invention is applicable to the printing of all textiles, natural as well as synthetic, and blends of both including, but without limitation, cellulosic fabrics, regenerated cellulosic fabrics, animal fiber fabrics, such as silk and wool fabrics, etc.

The following examples are given for the purpose of illustrating the invention. It will be understood the invention is not limited to these examples.

Example I

Using an Eppenbach homogenizer, a slurry containing 10 lbs. of sodium alginate and about 90 lbs. of glycerin was dissolved in 725 lbs. of water. 100 lbs. of a 15% aqueous solution of ammonium caseinate were then dissolved in the solution. Thereafter, 180 lbs. of sodium carbonate were dissolved therein and then about 290 lbs. of sodium formaldehyde sulphoxylate. About 25 lbs. of a dispersing agent (sodium lignin sulphonate) were then added and thereafter about 50 lbs. of hydrocarbon oil (Shell mineral spirits 8181) while continuing the agitation. The remaining 520 lbs. of the hydrocarbon oil were gradually added below the surface of the batch while continuing the agitation. After addition of all of the hydrocarbon oil, the homogenization is continued and the resultant oil-in-water emulsion was then fed through a colloid mill equipped with a cooling jacket to maintain the emulsion temperature below 80° F.

The resultant vehicle or carrier had the following percentage composition:

| | |
|---|---|
| Water | 41.50 |
| Thickener (sodium alginate) | 0.50 |
| Hygroscopic agent (glycerine) | 5.00 |
| Ammonium caseinate | 0.75 |
| Alkali (sodium carbonate) | 9.00 |
| Reducing agent (sodium formaldehyde sulphoxylate) | 14.50 |
| Dispersing agent (sodium lignin sulphonate) | 1.00 |
| Hydrocarbon oil (8181 mineral spirits) | 27.75 |
| Total | 100.00 |

To 90 parts of the above brown-colored emulsion were added 10 parts of a commercially available vat dyestuff printing paste containing a thiazole derivative of 2,6-dibenzamidoanthraquinone (Prototype #9). The resultant colored emulsion was then printed and dried using a conventional intaglio roller printing machine, on a cotton corduroy fabric which had been previously dyed with a direct dyestuff of Color Index #401, diazotized, developed with meta-phenylenediamine and finally after-treated with formaldehyde. The printed and dyed fabric was then finished; this finishing operation consisting of ageing in a horizontal vat ager, for 10 minutes, at a temperature of 101° to 103° C., oxidizing with a solution of hydrogen peroxide, washing at a temperature of 50° to 60° C. and finally drying. The final effect consisted of a bright yellow print on a deep black background which is fully as sharp and as free from halation as one which would be obtained with the use of a conventional starch thickener. The print was, however, much softer, brighter, and stronger. The pile of the fabric was not matted down or otherwise distorted, as it would be if the fabric were printed with a conventional starch thickener, and required much less brushing to restore it to its original condition.

Example II

The constituents of this example were mixed in substantially the same manner as described above in Example I. The vehicle or carrier of this example (II) had the following percentage composition:

| | |
|---|---|
| Water | 43.00 |
| Thickener (sodium alginate) | 0.50 |
| Hygroscopic agent (glycerine) | 5.00 |
| Ammonium caseinate | 1.00 |
| Alkali (sodium carbonate) | 6.00 |
| Reducing agent (sodium formaldehyde sulphoxylate) | 8.00 |
| Dispersing agent (sodium lignin sulphonate) | 0.50 |
| Hydrocarbon oil (Shell 8181 mineral spirits) | 36.00 |
| Total | 100.00 |

To 90 parts of the above brown-colored emulsion were added 10 parts of a commercially available vat dyestuff printing paste containing 6,6'-dichloro-4,4'-dimethyl-bis-thionaphthene indigo (Prototype #109). The resultant pink colored emulsion was then printed and dried using a conventional intaglio roller printing machine, on a cotton corduroy fabric which had been previously dyed with a dischargeable direct dyestuff of Color Index #533. The printed and dried fabric was then finished in the same manner as the one described in Example I. The result consisted of a bright pink printed on a blue background and had all the desirable attributes of the fabric described in Example I.

Example III

The constituents of this example were mixed in substantially the same manner as described above in connection with Example I, but with the omission of the step involving the addition of the dispersing agent. The reduction catalyst (anthraquinone) was added after the hydrocarbon oil when the emulsification was completed. The vehicle or carrier of this example (III) had the following percentage composition:

| | |
|---|---|
| Water | 40.10 |
| Thickener (sodium alginate) | 0.40 |
| Hygroscopic agent (glycerine) | 4.50 |
| Sodium caseinate | 1.00 |
| Alkali (sodium carbonate) | 8.50 |
| Reducing agent (sodium formaldehyde sulphoxylate) | 14.00 |
| Catalyst (anthraquinone) | 1.50 |
| Hydrocarbon oil (Shell 8181 mineral spirits) | 30.10 |
| Total | 100.00 |

To 85 parts of the above white translucent emulsion were added 15 parts of a commercially available vat dyestuff printing paste containing 2,2-dimethoxydibenzanthrone (Color Index #1101). The resultant green colored emulsion was then printed and dried using a conventional intaglio roller printing machine, on a cotton corduroy fabric which had been previously dyed by the coupling of 6-chloro-2-aminotoluene hydrochloride (Prototype #442), and the p-chloranilide of 2-ozycarbazole-3-carboxylic acid (Prototype #387). The printed and dried fabric was then finished in the same manner as the one described in Example I. The result consisted of a bright green print on a brown background that had all the desirable attributes of the fabric described in Example I.

Example IV

The constituents of this example were mixed in substantially the same manner as described above in connection with Example I, except that the condensation product of 1 mol of iso-hexyl-heptyl-beta-naphthol with 8 mols of ethylene oxide were substituted for the sodium lignin sulphonate. The vehicle or carrier of this example (IV) had the following percentage composition:

| | |
|---|---|
| Water | 42.75 |
| Thickener (sodium alginate) | 0.25 |
| Hygroscopic agent (2-methyl-2-4-pentanediol) | 5.00 |
| Ammonium caseinate | 1.50 |
| Alkali (potassium carbonate) | 8.00 |
| Reducing agent (sodium formaldehyde sulphoxylate) | 10.00 |
| Dispersing agent (condensation product of 1 mol of iso-hexyl-heptyl-beta-naphthol with 8 mols of ethylene oxide) | 0.50 |
| Hydrocarbon oil (Shell 8181 mineral spirits) | 32.00 |
| Total | 100.00 |

To 88 parts of the above white transluscent emulsion were added 12 parts of a commercially available vat dyestuff printing paste containing 4,5:4',5'-dibenzo thioindigo (Prototype #121). The resultant brown-colored emulsion was printed using a conventional intaglio roller printing machine, on a white 80 x 80 all-cotton fabric and finally dried. The fabric was then finished in the same manner as the one described in Example I. The final effect consisted of a deep brown print on a white background. This printed effect was sharper and stronger than one which would have been obtained with the use of a conventional starch thickener. Since there was no residual thickener remaining in the printed area, it was also much softer and the fabric was uniformly absorbent; thereby rendering it much more suitable for any subsequent finishing operation desired to make it dimensionally stable, crease proof, or water repellent.

*Example V*

The ingredients of this example were mixed in substantially the same manner as described above in Example IV, but with the addition of the reduction catalyst (anthraquinone) after the emulsification was completed. The vehicle or carrier of this example (V) had the following percentage composition:

| | |
|---|---|
| Water | 41.15 |
| Sodium caseinate | 1.00 |
| Alkali (sodium carbonate) | 4.50 |
| Alkali (sodium hydroxide) | 1.00 |
| Reducing agent (sodium formaldehyde sulphoxylate) | 15.00 |
| Dispersing agent (condensation product of 1 mol of iso-hexylheptyl-beta-naphthol with 8 moles of ethylene oxide) | 0.15 |
| Hydrocarbon oil (Shell 8181 mineral spirits) | 26.70 |
| Whitening agent (rutile titanium dioxide) | 9.00 |
| Catalyst (anthraquinone) | 1.50 |
| Total | 100.00 |

The resultant light pink colored emulsion (color is derived from reduction of anthraquinone) was printed and dried using a conventional intaglio roller printing machine, on an all-cotton 80 x 80 print cloth which had been previously dyed by the coupling of the stabilized diazo compound of p-chloro-O-nitraniline (Prototype #269) and the p-aniside of 2,3-oxynaphthoic acid (Prototype #312). The printed and dried fabric was then aged in a horizontal vat ager for 10 minutes at a temperature of 101° to 103° C. After ageing, the fabric was washed in an open width washer in a solution of sodium carbonate and a nonionic detergent, rinsed and finally dried. The resultant effect consisted of a sharp white print area on a deep red background.

*Example VI*

The ingredients in this example were mixed in the same manner as the ones in Example V. In this case, however, the reduction catalyst (anthraquinone) and the dispersing agent were omitted; thus, this example involved the use of a formulation in which the water-soluble caseinate served both as an anti-oxidant for the reducing agent and as a dispersing agent and stabilizer for the emulsion. The vehicle or carrier of this emulsion (VI) had the following percentage composition:

| | |
|---|---|
| Water | 36.00 |
| Thickening agent (sodium alginate) | 1.00 |
| Potassium caseinate | 1.50 |
| Reducing agent (sodium formaldehyde sulphoxylate) | 15.00 |
| Whitening agent (rutile titanium dioxide) | 7.00 |
| Hydrocarbon oil (Shell 8181 mineral spirits) | 39.50 |
| Total | 100.00 |

The above white-colored emulsion was printed on all cotton corduroy fabric which had been previously dyed with a dischargeable direct dyestuff of Prototype #71. After printing on a conventional intaglio roller printing machine, and drying, the fabric was finished in the same manner described for the fabric in Example V. The resultant effect consisted of a pure white print on a navy blue background. The printed area was as sharp as would have been obtained if a starch thickener had been used. The emulsion, however, had penetrated much deeper into the pile of the fabric and the printed area was unblemished by traces of the original blue background as it would have been if starch had been used in the printing vehicle.

*Example VII*

The ingredients of this example were mixed in the same manner as described above for Example I, but the dispersing agent (sodium lignin sulphonate) was omitted from the formula. The vehicle or carrier of this example (VIII) had the following percentage composition:

| | |
|---|---|
| Water | 42.25 |
| Hygroscopic agent (diethylene glycol) | 5.00 |
| Thickener (carboxymethyl cellulose 120HV) | 1.00 |
| Ammonium caseinate | 0.75 |
| Alkali (potassium carbonate) | 8.00 |
| Reducing agent (sodium formaldehyde sulphoxylate) | 11.00 |
| Hydrocarbon oil (Shell 8181 mineral spirits) | 32.00 |
| Total | 100.00 |

To 85 parts of the above white transluscent emulsion were added 15 parts of a commercially available vat dyestuff printing paste containing a mixture of (a) dibenzanthrone (Color Index #1099), (b) the b,b'-dibromo derivative of 3,4,8,9-dibenzopyrene-5-10 quinone, and (c) the cis isomer of naphthalene-bisimidazole. This resultant brown colored emulsion was then printed, using a conventional intaglio roller printing machine on an all-cotton bark cloth. After printing and drying the fabric was finished in the manner as described in Example I. The washing operation after drying, however, was conducted at a higher temperature (80° to 85° C.). The print obtained was much smoother, stronger, and clearer than would have been obtained if the known starch thickeners had been used. The final feel of the fabric was very soft, completely absorbent and in excellent condition for subsequent finishing operations.

*Example VIII*

The ingredients of this example were mixed in substantially the same manner as described above in Example I. The dispersing agent (sodium lignin sulphonate) was omitted. The vehicle or carrier described in this example (VIII) had the following percentage composition:

| | |
|---|---|
| Water | 44.75 |
| Thickener (sodium alginate) | 0.30 |
| Hygroscopic agent (glycerin) | 3.00 |
| Sodium caseinate | 1.50 |
| Alkali (sodium carbonate) | 6.25 |
| Reducing agent (sodium formaldehyde sulphoxylate) | 5.00 |
| Hydrocarbon Oil (Shell 8181 mineral spirits) | 39.20 |
| Total | 100.00 |

To 95 parts of the above white transluscent emulsion were added 5 parts of a commercially available vat dyestuff printing paste containing 5,7-5',7'-tetrabromindigo (Color Index #1184). This vat color printing emulsion was then printed by means of a silk screen on an all linen fabric. After air drying the printed fabric was aged for 12 minutes in a tower (vertical) ager at a temperature of 101° to 103° C. After ageing the fabric was oxidized and soaped in a rope washer. The final dried print consisted of blue characters on an all white background. It was much smoother and stronger than one which would have been obtained from a thickener which had been formulated with starch.

The print was very sharp and showed no evidence of having been "marked off" during the rope washing. This condition known as "marking off" (transfer of unfixed dye to areas which should be left white or their original color) is a common and greatly undesired occurrence when printing pastes containing starch or the necessarily high quantities of other gums are used as thickeners in screen printing. The susceptibility of the reducing agent (sodium formaldehyde sulphoxylate) to deterioration is greater when fabrics are screen printed. This can be attributed to the fact that the cloth must be air dried under conditions of fairly high humidity. The presence of the casein compounds, as in the foregoing examples, eliminates the destruction of the reducing agent by in some manner acting as an antioxidant against the oxygen present in the atmosphere.

*Example IX*

The ingredients of this example were mixed in substantially the same manner as described above in Example I. The dispersing agent (sodium lignin sulphonate) was again omitted. The percentage composition of this vehicle or carrier was as follows:

| | |
|---|---:|
| Water | 38.25 |
| Thickening agent (guar gum, refined endosperm of the guar seed) | 0.25 |
| Hygroscopic agent (2-methyl-2-4-pentanediol) | 4.00 |
| Ammonium caseinate | 2.00 |
| Alkali (sodium carbonate) | 6.50 |
| Reducing agent (sodium formaldehyde sulphoxylate) | 9.00 |
| Hydrocarbon oil (Shell 8181 mineral spirits) | 40.00 |
| Total | 100.00 |

To 90 parts of the above white transluscent emulsion were added 10 parts of a commercially available vat dyestuff printing paste containing a mixture of 6,6'-dichloro-4,4' dimethyl-bis-thionaphthene (Color Index #109) and 6,6'-diethoxythioindigo (Color Index #1217). This red colored vat dyestuff printing emulsion was then screen printed using a blotch screen which had approximately 75% print area. The fabric printed was an all-rayon faille. The printed and dried fabric was then finished in substantially the same manner as described above in Example VIII. In this case, however, due to the nature of the fabric it was soaped in an open width washer. After drying, the fabric presented a much superior appearance when compared to one which had been printed with conventional starch thickeners. The blotch area was very smooth and free from streaks and mottling. The dyestuff was well penetrated through the fibers of the fabric which is contrary to what is usually obtained on tightly woven fabrics of this nature.

*Example X*

The constituents of this example were mixed in substantially the same manner as described above for Example I. The dispersing agent has been omitted and part of the hygroscopic agent (glycerin) has been replaced with urea. The vehicle or carrier of this example (X) had the following percentage composition:

| | |
|---|---:|
| Water | 41.25 |
| Thickener (carboxymethyl cellulose 120HV) | 0.25 |
| Hygroscopic agent (glycerin) | 3.00 |
| Hygroscopic agent (urea) | 2.00 |
| Ammonium caseinate | 1.00 |
| Alkali (potassium carbonate) | 8.00 |
| Reducing agent (sodium formaldehyde sulphoxylate) | 9.00 |
| Hydrocarbon oil (Shell 8181 mineral spirits) | 35.50 |
| Total | 100.00 |

To 90 parts of the above white translucent emulsion were added 10 parts of a commercially available vat dye-stuff printing paste containing dichloro-isodibenzanthrone (Color Index #1104). This vat dyestuff colored printing emulsion was then screen printed on an all-cotton sheeting fabric. The screen used in this case was of a design which consisted mainly of very fine lines. No difficulty was experienced during printing as would have been the case with high solid conventional starch thickeners which have a tendency to plug up very fine designs. This necessitates frequent cleaning of the screen during the printing operation in order to maintain the uniformity of the print. After printing and drying this fabric was finished in the same manner as the one described above in Example IX. The final effect consisted of a very fine violet line on a white background and was superior to what would have been obtained had conventional starch thickeners been used.

*Example XI*

The constituents of this example were mixed in substantially the same manner as described above for Example I. The dispersing agent (sodium lignin sulphonate) has been omitted. The vehicle or carrier of this example (XI) had the following percentage composition:

| | |
|---|---:|
| Water | 41.50 |
| Thickener (carboxymethyl cellulose 120HV) | 0.25 |
| Hygroscopic agent (glycerin) | 5.00 |
| Potassium caseinate | 0.75 |
| Alkali (potassium carbonate) | 9.00 |
| Reducing agent (sodium formaldehyde sulphoxylate) | 12.00 |
| Hydrocarbon oil (Shell 8181 mineral spirits) | 31.50 |
| Total | 100.00 |

To 90 parts of the above white translucent emulsion were added 10 parts of a commercially available vat dyestuff printing paste containing dibromo-pyranthrone (Color Index #1098). This vat dyestuff colored printing emulsion was then printed using a surface or peg printing machine, which can be typified by the type which is used for the printing of oilcloth and wallpaper. The fabric printed was an all-cotton broadcloth. After printing the fabric was finished in the same manner as the one described in Example I. The final effect consisted of a bright orange print on a white background which was superior to what would have been obtained if a conventional starch thickener had been used. It has been very difficult, up to this time, to obtain, from surface printing rollers, a perfect impression of the pattern. In printing vat colors, on this type of machine using starch thickeners, the color furnishing blanket has a great tendency to act as a filter. This filtering action removes the dye from the paste during the operation of the machine and the final outcome, after a time, is that only the thickener is being printed. I have found when using emulsions of the type described above, that this does not take place.

It has also been very difficult, on surface printing machines, to obtain smooth prints. This defect in the process is partly due to the fact that the color is applied from a rounded surface to one which is not perfectly absorbent. This causes the color paste to lay on the printing roller in a very uneven manner with the result that it is transferred to the fabric in the same uneven manner which gives the print a mottled and smeared appearance. I have found that some of this unevenness is caused by improper viscosity characteristics of the printing paste. Emulsions of the type described above have viscosity and fluidity characteristics of a nature that makes them very suitable for this type of printing. The print obtained in this example is a great deal smoother and much freer from streaks and smears than one which would have been obtained had a conventional starch thickener been used.

It will be noted that the present invention provides textile printing emulsions of improved stability containing water-soluble formaldehyde sulphoxylate reducing agent, free of the conventional starch and gum thickeners. The emulsion can remain in storage for months without showing signs of decomposition. After application of the emulsion to the fabric it is not necessary to treat the fabric promptly, as, for example, by passage through an ager followed by the usual washing and drying treatments, but the printed fabric can remain for substantial periods of time, several days and even longer, without deleterious effect and upon subsequent treatment in an ager will produce color prints of sharp definition and improved wash-fastness. This property, of course, facilitates the manufacturing operation as it eliminates the necessity of prompt treatment of the fabric after printing.

The present invention results in a marked increase in color yield. In use, the oil-in-water emulsions of the present invention do not result in the production on the cloth of residual or undesired reaction products which are difficult to remove therefrom; on the contrary, the reaction products produced during the operation are readily removed by simple washing treatment. The oil-in-water emulsion and the mixture thereof with the vat dye flow smoothly and uniformly so they can be applied to the fabric without producing streaks or "snaps." Moreover, the printing equipment can be cleaned readily after use with the emulsions because the emulsions on standing do not form gummy or resinous masses which are difficult to remove and the addition of water results in a thinning of the emulsions facilitating their removal from the equipment by a simple water wash.

It will be understood that this invention is not restricted to the present disclosure other than as defined by the present claims.

What is claimed is:

1. A textile printing oil-in-water emulsion containing as its essential constituents water, hydrocarbon oil, from about 4% to about 20% of a water-soluble formaldehyde sulphoxylate reducing agent dissolved in the water phase of said emulsion, and from about 0.5% to about 10% of water-soluble caseinate dissolved in said water phase.

2. The extile printing oil-in-water emulsion defined in claim 1, the water phase of which also contains from about 2% to about 10% by weight of alkali.

3. The textile printing oil-in-water emulsion defined in claim 1 in which the water and oil phases are in the proportions of from 25% to 45% by weight of the hydrocarbon oil phase to 55% to 75% by weight of the water solution phase.

4. A textile printing paste consisting of a vat dye and a carrier therefor constituted of an oil-in-water emulsion containing dissolved in the water phase a formaldehyde sulphoxylate reducing agent and a caseinate present in amount sufficient to minimize oxidation of the reducing agent while the reducing agent is maintained at atmospheric temperatures.

5. The textile printing paste defined in claim 4 containing up to 30% by weight of vat dye and at least 70% by weight of said oil-in-water emulsion, said emulsion containing dissolved in the water phase thereof from about 4% to about 20% by weight of said formaldehyde sulphoxylate and from about 0.5% to about 10% of said caseinate.

6. The textile printing paste defined in claim 5 in which the water phase of said oil-in-water emulsion also contains from about 2% to about 10% by weight of alkali.

7. An oil-in-water emulsion for coloring textiles, the inner phase of said emulsion consisting essentially of a volatilizable hydrocarbon oil and the outer phase consisting essentially of a water solution of a water-soluble formaldehyde sulphoxylate reducing agent and a water-soluble caseinate.

8. The oil-in-water emulsion defined in claim 7 and also containing a thickener from the group consisting of sodium alginate and carboxy methyl cellulose.

9. An oil-in-water emulsion, the inner phase of which consists essentially of a volatilizable hydrocarbon oil and the outer phase of which emulsion consists essentially of a water solution of a water-soluble formaldehyde sulphoxylate reducing agent and a water-soluble caseinate in the proportions of approximately from 0.5% to 15% by weight of water-soluble caseinate based on the weight of the emulsion and from 4% to 20% of said water-soluble formaldehyde sulphoxylate based on the weight of the emulsion.

10. The oil-in-water emulsion defined in claim 9 containing from 25% to 45% by weight of said hydrocarbon oil and from 55% to 75% by weight of said water solution.

11. An oil-in-water emulsion, the inner phase of which consists essentially of a volatilizable hydrocarbon oil and the outer phase of which emulsion consists essentially of a water solution of a water-soluble formaldehyde sulphoxylate reducing agent, a water-soluble caseinate and alkali in the proportions of approximately from 0.5% to 15% by weight of water-soluble caseinate based on the weight of the emulsion, from 4% to 20% of said water-soluble formaldehyde sulphoxylate based on the weight of the emulsion, and from 2% to 12% by weight of alkali based on the weight of the emulsion.

12. An oil-in-water emulsion, the inner phase of which consists essentially of a volatilizable hydrocarbon oil and the outer phase of which emulsion consists essentially of a water solution of a water-soluble formaldehyde sulphoxylate reducing agent, a water-soluble caseinate and sodium carbonate in the proportions of approximately from 0.75% to 2% by weight of water-soluble caseinate based on the weight of the emulsion, from 8% to 18% of said water-soluble formaldehyde sulphoxylate based on the weight of the emulsion, and from 5% to 10% by weight of sodium carbonate based on the weight of the emulsion.

13. The oil-in-water emulsion defined in claim 12, in which the water-soluble formaldehyde sulphoxylate is an alkali metal formaldehyde sulphoxylate and the water-soluble caseinate is ammonium caseinate.

References Cited in the file of this patent

UNITED STATES PATENTS

| | | |
|---|---|---|
| 2,361,277 | Enderlin | Oct. 24, 1944 |
| 2,597,281 | Borstelmann | May 20, 1952 |
| 2,619,403 | Krause | Nov. 25, 1952 |